US012725800B2

(12) United States Patent
Liu et al.

(10) Patent No.: US 12,725,800 B2
(45) Date of Patent: Sep. 1, 2026

(54) BATTERY AND ELECTRICAL APPARATUS

(71) Applicant: Sunwoda Mobility Energy Technology Co., Ltd., Shenzhen (CN)

(72) Inventors: Peng Liu, Shenzhen (CN); Man Li, Shenzhen (CN); Yun Chen, Shenzhen (CN); Chunbo Chu, Shenzhen (CN)

(73) Assignee: Sunwoda Mobility Energy Technology Co., Ltd., Shenzhen (CN)

( * ) Notice: Subject to any disclaimer, the term of this patent is extended or adjusted under 35 U.S.C. 154(b) by 482 days.

(21) Appl. No.: 18/523,957

(22) Filed: Nov. 30, 2023

(65) Prior Publication Data

US 2024/0234725 A1 Jul. 11, 2024

Related U.S. Application Data

(63) Continuation of application No. PCT/CN2023/115700, filed on Aug. 30, 2023.

(30) Foreign Application Priority Data

Jan. 9, 2023 (CN) ........................ 202310027089.X

(51) Int. Cl.
*H01M 4/583* (2010.01)
*H01M 10/0525* (2010.01)
*H01M 4/02* (2006.01)

(52) U.S. Cl.
CPC ....... *H01M 4/583* (2013.01); *H01M 10/0525* (2013.01); *H01M 2004/021* (2013.01); *H01M 2004/027* (2013.01)

(58) Field of Classification Search
CPC ............. H01M 4/583; H01M 10/0525; H01M 2004/021; H01M 2004/027
USPC .......................................................... 429/209
See application file for complete search history.

(56) References Cited

U.S. PATENT DOCUMENTS

| | | | |
|---|---|---|---|
| 12,087,934 | B2 | 9/2024 | Choi et al. |
| 2024/0038990 | A1 | 2/2024 | Tang et al. |

FOREIGN PATENT DOCUMENTS

| | | | |
|---|---|---|---|
| CN | 102637859 | 8/2012 | |
| CN | 103259002 | 8/2013 | |
| CN | 107195960 | 9/2017 | |
| CN | 107195960 A * | 9/2017 | ........ H01M 10/0569 |
| CN | 113161515 | 7/2021 | |
| CN | 113614949 | 11/2021 | |
| CN | 114597326 | 6/2022 | |
| CN | 115472833 | 12/2022 | |
| CN | 115472896 | 12/2022 | |
| CN | 115528206 | 12/2022 | |
| CN | 116093249 | 5/2023 | |
| EP | 3588629 A1 * | 1/2020 | ........ H01M 10/0525 |

OTHER PUBLICATIONS

Machine translation of CN 107195960 A (Year: 2017).*

International Search Report and the Written Opinion Dated Oct. 1, 2023 From the International Searching Authority Re. Application No. PCT/CN2023/115700 and Its Translation Into English. (16 Pages).

Notification of Office Action and Search Report Dated Oct. 31, 2024 From The State Intellectual Property Office of the People's Republic of China Re. Application No. 202310027089.X and Its Translation Into English. (24 Pages).

Notice of Reasons for Refusal dated Jun. 9, 2025 for Japanese Patent Application No. 2024-519799, with English translation.

Notice of Reasons for Refusal dated Oct. 29, 2025 for Japanese Patent Application No. 2024-519799, with English translation.

Extended European Search Report mailed Oct. 30, 2025 for European Patent Application No. 23809074.0.

* cited by examiner

*Primary Examiner* — Kevin P Kerns

(74) *Attorney, Agent, or Firm* — Alix, Yale & Ristas, LLP

(57) ABSTRACT

Disclosed are batteries and electrical apparatuses. Non-faradaic capacitance of the negative electrode plate is Cdl nF, the sphericity of the negative active material contained in the negative electrode plate is S, and Cdl and S satisfy $0.5 \leq Cdl \times S \leq 5$. By adjusting Cdl value and sphericity S, so that they are in the range of $0.5 \leq Cdl \times S \leq 5$, which can effectively reduce the specific surface area of the negative active material, increase the tap density, so that the negative electrode plate has a high tap density without causing overpressure phenomenon. Furthermore, the mechanical stress experienced by the negative active materials of the negative electrode plate during rolling is minimized, and the reaction area with the electrolyte is minimized, it has good liquid retention properties, thereby avoiding the occurrence of gas generation and swelling, so that the batteries have excellent rate performance and cycle performance.

20 Claims, 1 Drawing Sheet

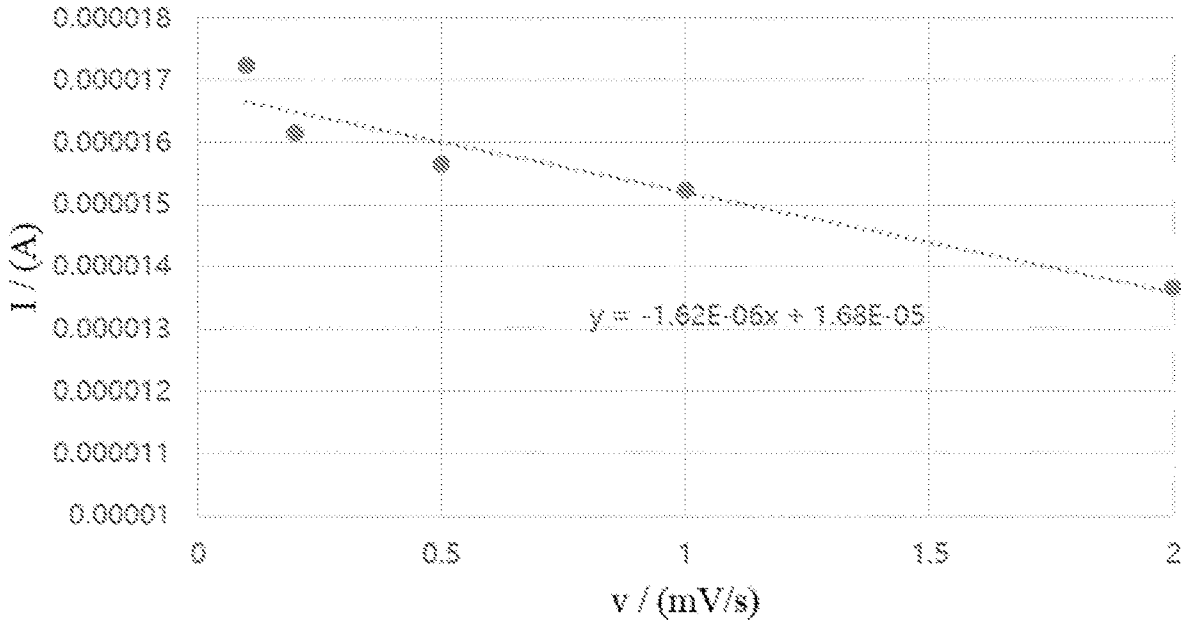
Sweep rate versus current
0.000018
0.000017
0.000016
0.000015
0.000014
0.000013
0.000012
0.000011
0.00001
I / (A)
y = -1.62E-06x + 1.68E-05
0
0.5
1
1.5
2
v / (mV/s)

BATTERY AND ELECTRICAL APPARATUS

RELATED APPLICATIONS

This application is a Continuation of PCT Patent Application No. PCT/CN2023/115700 having International filing date of Aug. 30, 2023, which claims the benefit of priority of Chinese Patent Application No. 202310027089.X filed on Jan. 9, 2023. The contents of the above applications are all incorporated by reference as if fully set forth herein in their entirety.

FIELD AND BACKGROUND OF THE INVENTION

The present disclosure relates to the technical field of new energy technologies, in particular to a secondary battery and a battery and an electrical apparatus.

Lithium-ion batteries have been widely used in various fields due to their high specific energy, good power performance, low self-discharge and long cycle life. In order to increase the energy density of the lithium-ion batteries, the gram capacity and the compaction density of the negative electrode plate can be increased by a compaction method. However, an overpressure phenomenon is easy to occur during compaction, which results in a slow rate at which the negative electrode plate is infiltrated by an electrolyte, and a decrease in performance of absorbing the electrolyte and performance of retaining the electrolyte, which, on the contrary, are not conducive to improving the energy density and the circulation performance of lithium-ion batteries.

The present disclosure provides a battery and an electrical apparatus, which improve the problem that a negative electrode plate of a battery has poor effect in being infiltrated by an electrolyte and a poor performance in absorbing the electrolyte due to overpressure, thereby improving the energy density, rate and cycle performance of the battery.

SUMMARY OF THE INVENTION

In a first aspect, the present disclosure provides a battery including a positive electrode plate, a negative electrode plate, a separator, and an electrolyte.

The positive electrode plate includes a positive electrode current collector and a positive film disposed on at least one surface of the positive electrode current collector, and the positive film includes a positive active material.

The negative electrode plate includes a negative electrode current collector and a negative film disposed on at least one surface of the negative electrode current collector, the negative film includes a negative active material. The negative active material includes negative active particles containing pores.

The non-faradic capacitance of the negative electrode plate is Cdl nF, and a sphericity of the negative active material is S, and satisfies: $0.5 \leq Cdl \times S \leq 5$.

In the embodiments of the present disclosure, $0.5 \leq Cdl \leq 8$, and $0.2 \leq S \leq 0.9$.

In the embodiments of the present disclosure, the negative active material has a pore size of r nm, and satisfies: $1.2 \leq 0.1 \times r + Cdl \leq 10$.

In the embodiments of the present disclosure, a pore size distribution of the negative active material satisfies: $2 \leq r \leq 20$.

In the embodiments of the present disclosure, the pore size distribution of the negative active material satisfies: the negative active material has at least one peak in a region with the pore size distribution of 2 nm to 6 nm.

In the embodiments of the present disclosure, the negative active material contains sulfur element.

In the embodiments of the present disclosure, a liquid absorption time of the negative film is T min, and a compacted density of the negative film is PD g/cm$^3$, and satisfies: $0.3 \leq T \times PD \leq 5.8$.

In the embodiments of the present disclosure, $0.25 \leq T \leq 3.5$; and $1.1 \leq PD \leq 1.7$.

In the embodiments of the present disclosure, Dv50 of the negative active material is $D_1$ μm, Dv50 of the positive active material is $D_2$ μm, and the D1 and $D_2$ satisfy at least one of the following:

(c) $1 \leq D_1/D_2 \leq 36$;

(d) $6 \leq D_1 \leq 18$; and (e) $0.5 \leq D_2 \leq 8$.

In the embodiments of the present disclosure, a powder compacted density of the negative active material under a pressure of 30 KN is $P_1$ g/cm$^3$, a powder compacted density of the positive active material under a pressure of 30 KN is $P_2$ g/cm$^3$, and satisfies $1.5 \leq P_2/P_1 \leq 2.5$.

Optionally, $1.5 \leq P_1 \leq 2.0$, and $2 \leq P_2 \leq 4$.

In the embodiments of the present disclosure, the negative active material includes a carbon material, and the carbon material includes graphite.

In a second aspect, the embodiments of the present disclosure further provide an electrical apparatus including the battery provided in the above-described embodiments, which is used as a power supply for the electrical apparatus.

According to the present disclosure, the relationship between the non-faradic capacitance (Cdl nF) of the negative electrode plate and the sphericity (S) of the negative active materials contained in the negative electrode plate is adjusted, which effectively reduces the specific surface area of the negative active materials, so that the negative electrode plate has a high tap density without causing overpressure phenomenon. Furthermore, the mechanical stress experienced by the negative active materials of the negative electrode plate during rolling is reduced, and the reaction area with the electrolyte is reduced, so as to obtain good performance in absorbing the electrolyte and good effect in being infiltrated by the electrolyte, thereby reducing the occurrence of gas generation and swelling, so that the batteries have excellent fast charge-discharge performance, good rate performance and cycle performance. Moreover, the negative active particles of the present disclosure have pores, which can further improve the performance of the negative electrode plate in retaining the electrolyte and effect in being infiltrated by an electrolyte, thereby improving the overall performance of the batteries.

It can be understood that the electrical apparatus provided by the embodiments of the present disclosure has all the technical features and beneficial effects of the above-mentioned battery, which will not be repeated herein.

BRIEF DESCRIPTION OF THE SEVERAL VIEWS OF THE DRAWINGS

FIG. 1 is the sweep rate versus current scatter plot of Example 1 of the present disclosure.

DESCRIPTION OF SPECIFIC EMBODIMENTS OF INVENTION

The present disclosure provides a battery and an electrical apparatus. In order to make the purpose, technical solutions and effects of the present disclosure more clear and definite, the present disclosure will be further described in detail with reference to the attached drawings and embodiments. It should be understood that the specific embodiments described herein are only used to explain the present disclosure, and are not intended to limit the present disclosure.

Inventors have found in the research that if an overpressure is generated during the rolling process for preparing the negative electrode plate of a battery, the effect of negative electrode plate being infiltrated by an electrolyte and the performance in absorbing the electrolyte will be affected, which will further affect the rate performance and the cycle performance of the battery.

In order to solve the above problem, embodiments of the present disclosure provide a battery (or a lithium-ion battery), wherein negative electrode active particles are controlled to have pore structures, meanwhile the non-faradic capacitance (Cdl nF) of the negative electrode plate and the sphericity (S) of the negative active materials contained in the negative electrode plate is adjusted, so that the specific surface area of the negative active materials is effectively reduced, and the negative electrode plate has a high tap density without causing overpressure phenomenon. Furthermore, the mechanical stress experienced by the negative active materials of the negative electrode plate during rolling is reduced, and the reaction area with the electrolyte is reduced, so as to obtain good performance in absorbing the electrolyte and good effect in being infiltrated by the electrolyte, thereby reducing the occurrence of gas generation and swelling, so that the batteries have excellent fast charge-discharge performance, good rate performance and cycle performance.

In some embodiments of the present disclosure provide a battery including a positive electrode plate, a negative electrode plate, a separator, and an electrolyte. The separator is disposed between the positive electrode plate and the negative electrode plate.

The positive electrode plate includes a positive electrode current collector and a positive film disposed on at least one surface of the positive electrode current collector. The positive film includes a positive active material.

The negative electrode plate includes a negative electrode current collector and a negative film disposed on at least one surface of the negative electrode current collector. The negative film includes a negative active material. The negative active material includes negative active particles containing pores. The non-faradic capacitance of the negative electrode plate is Cdl nF, and a sphericity of the negative active material is S, and satisfies: $0.5 \leq Cdl \times S \leq 5$.

In some embodiments of the present disclosure, the non-faradic capacitance of the negative electrode plate is Cdl nF, and a sphericity of the negative active material is S, and satisfies: $1 \leq Cdl \times S \leq 4.5$. When Cdl and S satisfies $1 \leq Cdl \times S \leq 4.5$, the specific surface area and the tap density of the negative active material can be further adjusted, so that the negative electrode plate has a high density without causing overpressure phenomenon, and at the same time, the reaction area between the negative electrode plate and the electrolyte can be within a suitable range, thereby further improving the overall performance of the battery.

In some embodiments of the present disclosure, the non-faradic capacitance of the negative electrode plate is Cdl nF, and a sphericity of the negative active material is S, and satisfies: $1.5 \leq Cdl \times S \leq 4$. When Cdl and S satisfies $1.5 \leq Cdl \times S \leq 4$, the overall performance of the battery can be further improved.

In some embodiments of the present disclosure, the non-faradic capacitance of the negative electrode plate is Cdl nF, and a sphericity of the negative active material is S, and satisfies: $2 \leq Cdl \times S \leq 3$.

A method for testing the non-faradic capacitance value Cdl of a negative electrode plate in embodiments of the present disclosure includes steps of:

S1. Assembling of a buckle includes steps of: drying the obtained negative electrode plate, cutting it into small discs, weighing the small discs, and transferring them to a vacuum oven, in which the discs are dried at 100° ° C. for 8 hours, then transferring the small discs to a glove box filled with argon for assembling of the buckle.

S2. Confirmation of non-faraday potential range includes steps of: Subjecting the assembled buckle to cyclic voltammetry (CV) test to confirm the non-faraday potential range of the buckle, wherein the voltage ranges from 0.005 V to 3.0 V, and the sweep rate ranges from 0.1 mV/s to 1 mV/s.

S3. Non-faradaic potential range cathodic scanning includes steps of: Performing a linear sweep voltammetry (LSV) test within a straight-segment potential range randomly selected in S2, and collecting a voltage-current curve, wherein the scanning direction is from high potential to low potential. The selected potential range is from 2.6 V to 2.7 V, and the sweep rate ranges from 0.05 mV/s to 5 mV/s. Then selecting the median value U of the potential range at a certain sweep rate V1 (the certain sweep rate may be 0.1 mV/s, 0.2 mV/s, 0.5 mV/s, 1 mV/s, 2 mV/s, or the like) to obtain a corresponding current value, so that the sweep rate versus current scatter plot can be obtained.

S4. Calculation of non-faradaic capacitance value includes steps of: Obtaining a linear function by fitting according to the sweep rate versus current scatter plot obtained in step S3, and the slope K of the linear function is the non-faradaic capacitance Cdl value in the cathodic scanning direction of the negative electrode plate.

After the above test, the non-faradaic capacitance (Cdl nF) of the negative electrode plate in embodiments of the present disclosure ranges from 0.5 nF to 8 nF. The non-faradaic capacitance Cdl nF of the negative electrode plate may also range from 1 nF to 6 nF, 2 nF to 5 nF, or 3 nF to 4 nF. The basic unit of capacitance is Faraday, abbreviated as (F). 1 F=1000 mF, 1 mF=1000 μF, 1 μF=1000 nF. Therefore, 1 nF=$10^{-9}$ F.

The sphericity S of the negative active materials in the negative electrode plate in the embodiments of the present disclosure is measured by using a dynamic image particle analyzer. Exemplarily, the method for obtaining negative active materials from a negative electrode plate may be as follows: discharging a secondary battery at a constant current of 0.04 C to a lower voltage limit, disassembling to obtain a negative electrode plate, and soaking and cleaning the negative electrode plate with a dimethyl carbonate (DMC) solution, then washing the negative electrode plate with deionized water for many times, followed by pouring out an upper liquid, allowing standing and drying the lower solution, and finally performing heat treatment at 800° C. for 2 hours in argon atmosphere to obtain the above test sample.

A particle with a morphology closer to a sphere, its sphericity is closer to 1.

In some embodiments of the present disclosure, the negative active material has a sphericity (S) of 0.2 to 0.9. For example, S can be any one of 0.2, 0.3, 0.35, 0.4, 0.43, 0.45, 0.48, 0.5, 0.53, 0.55, 0.58, 0.6, 0.63, 0.65, 0.68, 0.7, 0.73, 0.75, 0.78, 0.8, 0.85, 0.9, or within a range defined by any two of these numbers. In case that the sphericity of the negative active material is within the above range, the morphologies of the negative active particles can be can be in a better state, and the overall performance of the battery can be improved. In some embodiments of the present disclosure, the sphericity (S) of negative active material ranges from 0.3 to 0.85. When the sphericity (S) ranges from 0.3 to 0.85, the overall performance of the battery can be further improved.

In some embodiments of the present disclosure, the sphericity (S) of negative active material ranges from 0.4 to 0.78.

In the embodiments of the present disclosure, the sphericity (S) of negative active material ranges from 0.45 to 0.73.

Lithium-ion batteries undergo electrochemical reactions during use. Electrochemical reactions include Faraday reactions in which the oxidation state of the active material changes and charges move to the inside of the active materials; and non-faraday reactions in which charges are stored and released by the physical adsorption and detachment of ions on surfaces of the active materials. The faraday reaction refers to a process in which the oxidation state of the active material changes and charges move through the double charge layer to the inside of the active material through the electrode interface. The non-faraday reaction refers to a reaction in which charges are stored and released by the physical adsorption and detachment of ions on the electrode surface without charges moving through the electrode interface.

Inventors of the present disclosure have found that the non-faradaic capacitance (Cdl) reflects the number of electrochemically active sites in the negative electrode plate. It is necessary to control the non-faradaic capacitance Cdl nF of the negative plate within a suitable range during the use of a battery. When the Cdl value is within a certain range, the larger the Cdl value, the greater the number of electrochemically active sites, which is beneficial to the contact between the active materials and electrolyte, thereby accelerating the conduction rates of ions and electrons and reducing the resistance of charge transfer, so that the rate performance can be effectively improved. Meanwhile, the sphericity S of the negative active material influences the isotropy of the negative active particles, and influences the direction and path of lithium ion desorption. Further, the sphericity S influences the distribution of the negative active materials in the negative electrode plate, and influences the contact between the negative active materials. The negative active particles have pore structures, which can further increase the infiltration speed of the negative electrode plate and the liquid retention performance. The three factors work together to effectively improve the overall performance of the battery. Therefore, the negative active materials and the negative electrode plate are adjusted, so that the non-faradaic capacitance Cdl nF of the negative electrode plate and the sphericity S of the negative active materials are within the range of $0.5 \leq Cdl \times S \leq 5$, which can not only effectively reduce the specific surface area of the negative active material, but also increase the tap density thereof, so that the negative electrode plate has a high density without causing overpressure phenomenon. Furthermore, the mechanical stress experienced by the negative active materials of the negative electrode plate during rolling is reduced, and the reaction area with the electrolyte is reduced, so as to obtain good performance in absorbing the electrolyte, thereby reducing the occurrence of gas generation and swelling, so that the batteries have excellent fast charge-discharge performance and cycle performance. Moreover, the negative active material includes a graphite material, and the negative active material is present in the form of negative active particles. Channels can be formed between these negative active particles to allow lithium ions to quickly enter the graphite layers, which shortens the solid-phase diffusion path of lithium ions, thereby increasing the charging rate of the negative electrode plate, realizing fast charging, and improving the fast charging performance thereof.

In the embodiments of the present disclosure, pore size of the negative active material is r nm, and the non-faradaic capacitance of the negative electrode plat is Cdl nF, and the relationship between r and Cdl satisfies $1.2 \leq 0.1 \times r + Cdl \leq 10$. Inventors of the present disclosure have found in the research that the pore size of the negative active material and the non-faradaic capacitance can affect the rapid charging capacity and cycle life of the lithium-ion battery. In a certain range, in case that the non-faradaic capacitance of the negative active material increases, the number of active sites on the surface thereof increases, so that contact between the negative active material and the electrolyte is sufficient. As a result, the impedance of the lithium-ion battery is reduced, and the capacity is increased. Suitable pore size can avoid crushing of the rolled particles while shortening the solid-phase diffusion path of the lithium ion in the negative active materials, thereby improving the kinetic performance of the lithium-ion battery. According to embodiment of the present disclosure, the pore size of the negative active material and the non-faradaic capacitance of the negative electrode plate are adjusted, so that lithium ions can be smoothly inserted into the negative active materials through the pores during the subsequent electrochemical reactions, thereby improving the cycle performance of the lithium-ion battery. On the other hand, the pore size can buffer the volume change of the lithium-ion battery during the charging and discharging process, thereby improving the cycle performance of the lithium-ion battery. Therefore, in the present disclosure, by reasonably adjusting the relationship between the pore size of the negative active material and the non-faradaic capacitance, so that their relationship satisfies $1.2 \leq 0.1 \times r + Cdl \leq 10$, the energy density, the fast charging performance, and the long cycle life of the lithium-ion battery can be balanced, thereby avoiding adverse effects of overpressure on these properties of lithium-ion battery.

In the embodiments of the present disclosure, pore size of the negative active material is r nm, and the non-faradaic capacitance of the negative electrode plate is Cdl nF, wherein r and Cdl satisfies $2 \leq 0.1 \times r + Cdl \leq 8$. When $2 \leq 0.1 \times r + Cdl \leq 8$, the pore size of the negative active material and the non-faradaic capacitance are in a more suitable range, which can further affect the infiltration performance of the electrolyte and the reaction between the negative active materials and the electrolyte, thereby improving the overall performance of the battery.

In the embodiments of the present disclosure, pore size of the negative active material is r nm, and the non-faradaic capacitance of the negative electrode plate is Cdl nF, wherein r and Cdl satisfies $3 \leq 0.1 \times r + Cdl \leq 7$.

In the embodiments of the present disclosure, pore size of the negative active material is r nm, and the non-faradaic capacitance of the negative electrode plate is Cdl nF, wherein r and Cdl satisfies $4 \leq 0.1 \times r + Cdl \leq 6$.

Optionally, in some embodiments of the present disclosure, the pore size (r) of the negative active material may range from 2 nm to 20 nm. For example, r nm may be any one of 2 nm, 3 nm, 3.5 nm, 4 nm, 4.5 nm, 4.8 nm, 5 nm, 5.3 nm, 5.5 nm, 5.8 nm, 6 nm, 6.5 nm, 6.8 nm, 7 nm, 7.5 nm, 7.8 nm, 8 nm, 8.5 nm, 9 nm, 10 nm, 11 nm, 12 nm, 12.5 nm, 13 nm, 13.5 nm, 14 nm, 14.5 nm, 15 nm, 15.5 nm, 16 nm, 17 nm, 18 nm, 19 nm, 20 nm, or within a range defined by any two of these values.

In the embodiments of the present disclosure, pore size of the negative active material ranges from 3 nm to 18 nm.

In the embodiments of the present disclosure, pore size of the negative active material ranges from 3.5 nm to 12 nm.

In the embodiments of the present disclosure, pore size of the negative active material ranges from 4 nm to 10 nm.

In the embodiments of the present disclosure, pore size of the negative active material ranges from 5 nm to 8 nm.

In case that the negative active material has a suitable pore size, the pressure resistance of the negative active particles and the diffusion of the negative active materials in the electrolyte are in a better range, so that the non-Faraday reaction can be enhanced, thereby improving the kinetic performance of the lithium ions.

Optionally, in some embodiments of the present disclosure, the negative active material has at least one peak in a region with a pore size distribution of 2 nm to 6 nm. When there is a peak in the region of 2 nm to 6 nm, the pore size distribution of the negative active material is in a better state, so that the overall performance of the battery can be further improved.

Optionally, in some embodiments of the present disclosure, the negative active material layer includes a sulfur element.

Optionally, in some embodiments of the present disclosure, the negative active material includes a sulfur element Optionally, in some embodiments of the present disclosure, the negative electrode active material includes a carbon material.

Optionally, in some embodiments of the present disclosure, the negative electrode active material includes graphite.

Optionally, in some embodiments of the present disclosure, the negative electrode active material includes artificial graphite.

Optionally, in some embodiments of the present disclosure, the coke raw material used in the negative active material contains a sulfur-containing material.

Optionally, in some embodiments of the present disclosure, the sulfur content of the coke raw material used in the negative active may range from 0.1 wt % to 4 wt %. For example, the sulfur content may be any one of 0.1 wt %, 0.2 wt %, 0.3 wt %, 0.5 wt %, 0.7 wt %, 0.8 wt %, 1.0 wt %, 1.2 wt %, 1.3 wt %, 1.5 wt %, 1.6 wt %, 1.8 wt %, 2.0 wt %, 2.1 wt %, 2.5 wt %, 2.7 wt %, 3.0 wt %, 3.2 wt %, 3.4 wt %, 3.5 wt %, 3.6 wt %, 3.8 wt %, 4.0 wt %, or within a range defined by any two of these numbers.

Optionally, in some embodiments of the present disclosure, the sulfur content in the coke raw material used in the negative active may also range from 0.2 wt % to 3 wt %.

Optionally, in some embodiments of the present disclosure, the sulfur content in the coke raw material used in the negative active may also range from 0.5 wt % to 2.5 wt %.

Optionally, in some embodiments of the present disclosure, the sulfur content in the coke raw material used in the negative active may also range from 1 wt % to 2 wt %.

Optionally, in some embodiments of the present disclosure, the content of volatiles in the coke raw material may range from 5 wt % to 15 wt %. For example, the content of volatiles in the coke raw material may be any one of 5 wt %, 5.5 wt %, 6 wt %, 6.5 wt %, 7 wt %, 7.5 wt %, 8 wt %, 8.5 wt %, 9 wt %, 9.5 wt %, 10 wt %, 10.5 wt %, 11 wt %, 11.5 wt %, 12 wt %, 12.5 wt %, 13 wt %, 13.5 wt %, 14 wt %, 14.5 wt %, 15 wt % or within a range defined by any two of these numbers.

Optionally, in some embodiments of the present disclosure, the content of volatiles in the coke raw material may also range from 6 wt % to 12 wt %.

Optionally, in some embodiments of the present disclosure, the content of volatiles in the coke raw material may also range from 8 wt % to 10 wt %.

Optionally, in some embodiments of the present disclosure, the coke raw material may be selected from coke, petroleum coke (such as petroleum pitch, etc.), coal tar, pitch coke (such as coal tar pitch, etc.), and the like. The purpose of selecting coke raw materials with specific raw material properties is to obtain negative active material particles with suitable pore structures by controlling the raw material properties of the negative active materials.

The sulfur content in the coke raw material is measured by energy dispersive X-ray fluorescence spectroscopy, and the volatiles are determined by SH/T0026-1990 petroleum coke volatiles. Sulfur is harmful to coking, gasification, combustion, storage and transportation. The volatile content affects the production efficiency of the raw materials and increases coal consumption. The sulfur entering during coking leads to a decrease in coke production capacity, and the sulfur dioxide generated during gasification corrodes the equipment, affects operation and product quality, and pollutes the environment. Therefore, selecting a coke raw material with an appropriate sulfur content can reduce the influence on the environment, reduce the impurity content, and have a good isotropy, so that the prepared lithium-ion battery has a good rate performance, thereby ensuring low impedance and self-stability during the cycle. In addition, the sulfur content of the coke raw material is also related to the appropriate pore size formed by the negative active material during rolling. When the negative active material is formed with appropriate pore sizes after rolling, the negative active material has a suitable compacted density, so that the non-faraday reaction can be enhanced, thereby improving the kinetic performance of the lithium ions and slowing down the overpressure phenomenon.

Optionally, in some embodiments of the present disclosure, hardgrove grindability index (HGI) of the coke material may range from 30 to 100. For example, the hardgrove grindability index (HGI) of the coke material may be any one of 30, 32, 35, 36, 38, 40, 44, 45, 48, 50, 52, 55, 56, 58, 60, 65, 70, 75, 80, 85, 90, 93, 95, 98, 100 or within a range defined by any two of these numbers.

Optionally, in some embodiments of the present disclosure, the hardgrove grindability index (HGI) of the coke material may range from 40 to 90.

Optionally, in some embodiments of the present disclosure, the hardgrove grindability index (HGI) of the coke material range from 50 to 80.

The hardgrove grindability index refers to the energy ratio consumed when samples and standard samples are ground into a specified number of grains and crushed to the same fineness under air drying conditions. It is used to measure the grindability of coke raw materials, and its value reflects the difficulty of crushing different types of coke raw materials. The hardgrove grindability index is measured by the Harderian method, which is a is an index to measure the hardness of coke raw materials. When the coke raw material is soft, the HGI value is relatively large, the coke raw material is easily crushed, and the obtained negative active material has a higher compacted density. However, too large or too small of the hardgrove grindability index will have a certain effect on the negative active material, so it needs to be within a certain range. Inventors have found that the compacted density and pore size distribution of the negative active material are possible to be controlled in the range of 30 to 100 by controlling the hardgrove grindability index HGI of the coke raw material.

Optionally, in some embodiments of the present disclosure, the liquid absorption time of the negative film is T min, and the compacted density of the negative film is PD g/cm$^3$, and the relationship between T and PD satisfies $0.3 \le T \times PD \le 5.8$. For example, the value of T×PD may be any one of 0.3, 0.4, 0.6, 0.7, 1.0, 1.2, 1.5, 1.8, 2.0, 2.3, 2.5, 2.8, 3, 3.5, 4.0, 4.4, 5.0, 5.2, 5.5, 5.6, 5.8, or within a range defined by any two of these values. When the value of T×PD is within the above range, the degree of extrusion between particles of the negative active materials and the porosity of the negative electrode plate are within a suitable range, so that the infiltration of the electrolyte on the negative film can be ensured, thereby reducing the polarization during the cycle of the battery and reducing the increase of the internal resistance of the battery.

Optionally, in some embodiments of the present disclosure, the liquid absorption time of the negative film is T min, and the compacted density of the negative film is PD g/cm$^3$, and the relationship between them may also satisfy $0.5 \le T \times PD \le 5.5$.

Optionally, in some embodiments of the present disclosure, the liquid absorption time of the negative film is T min, and the compacted density of the negative film is PD g/cm$^3$, and the relationship between them may also satisfy $1 \le T \times PD \le 5$.

Optionally, in some embodiments of the present disclosure, the liquid absorption time of the negative film is T min, and the compacted density of the negative film is PD g/cm$^3$, and the relationship between them may further satisfy $2 \le T \times PD \le 4$.

Optionally, in some embodiments of the present disclosure, the liquid absorption time (T) of the negative film may range from 0.25 min to 3.5 min (i.e., $0.25 \le T \le 3.5$, the same applies below). For example, it may be any one of 0.25, 0.3, 0.6, 0.7, 1.1, 1.5, 2, 3, 3.2, 3.5, or within a range defined by any two of these numbers.

Optionally, in some embodiments of the present disclosure, the liquid absorption time (T) of the negative film may also range from 0.5 min to 3 min.

Optionally, in some embodiments of the present disclosure, the liquid absorption time (T) of the negative film may also range from 1 min to 2.5 min.

Optionally, in some embodiments of the present disclosure, the compacted density (PD) of the negative film may range from 1.1 g/cm$^3$ to 1.7 g/cm$^3$ (i.e., $1.1 \le PD \le 1.7$). For example, the value of PD may be any one of 1.1, 1.2, 1.3, 1.4, 1.5, 1.6, 1.7 or within a range defined by any two of these numbers.

The liquid absorption time of the negative film can be measured by an optical contact angle measuring instrument. The detection method of liquid absorption time is as follows: when detecting the liquid absorption time, a drop of electrolyte (about 10 μL) is vertically dropped on the negative film on the surface of the negative electrode plate by using a micro-sampler, and meanwhile a stopwatch is used to start counting. After the electrolyte diffuses, the time it takes for complete infiltration of the electrolyte is recorded, which is liquid absorption time of the negative electrode plate. The longer the liquid absorption time is, the worse the infiltration performance of the negative electrode plate will be. The compacted density is closely related to the specific capacity, efficiency, internal resistance of the negative electrode plate and the cycling performance of the battery. In case that the compaction density is large, the energy density is large as well. However, in case that the degree of extrusion between particles of the active material is great, the porosity of the electrode plate is small, which makes it difficult for electrolyte to be infiltrated, resulting in poor liquid retention capacity of the battery, increase in the liquid absorption time of the negative film, increase in polarization during cycling, and increase in the internal resistance. Therefore, it is necessary to take into account the influence of liquid absorption time on the performance of lithium-ion batteries while controlling the compacted density of negative electrode plates, so as to improve the performance of lithium-ion batteries.

Optionally, in some embodiments of the present disclosure, Dv50 of the negative active material is $D_1$ μm, Dv50 of the positive active material is $D_2$ μm, and the relationship between $D_1$ and $D_2$ satisfies $1 \le D_1/D_2 \le 36$. Optionally, the value of $D_1/D_2$ may be at least one of 1, 3, 4, 6, 7, 8, 9, 10, 11, 15, 21, 23, 25, 27, 30, 32, 36 or within a range defined by any two of these numbers. When the particle size ratio of the positive active material and the negative active material is matched in the range of 1 to 36, both the positive electrode plate and the negative electrode plate can have high electron and lithium ion transport performance, so that the electrochemical reactions between the positive electrode plate and the negative electrode plate are in a relatively matched state, and the lithium-ion battery has high charging and discharging performance at a high rate.

Optionally, in some embodiments of the present disclosure, the relationship between $D_1$ and $D_2$ may also be $2 \le D_1/D_2 \le 35$.

Optionally, in some embodiments of the present disclosure, the relationship between $D_1$ and $D_2$ may also be $5 \le D_1/D_2 \le 30$.

Optionally, in some embodiments of the present disclosure, the relationship between $D_1$ and $D_2$ may also be $10 \le D_1/D_2 \le 20$.

Optionally, in some embodiments of the present disclosure, $6 \le D_1 \le 18$. Optionally, $D_1$ may be at least one of 6, 7, 8, 9, 10, 11, 12, 15, 16, 18 or within a range defined by any two of these numbers. In case that the particle sizes of the negative active particles are within the above range, the density of the structure forming the negative film can be in an appropriate range, which is conducive to the penetration of the electrolyte, so that the interface resistance of the negative active particles is within an appropriate range. As a result, the kinetic performance of the lithium ion battery is better. Meanwhile, the particle sizes of the negative active particles affect the dispersibility of the active particles in the slurry, which can reduce agglomeration of the negative active particles, so that the surface density distribution is more uniform, and the adhesive force of the electrode plate is suitable, and the electron conductivity of the negative electrode plate is in a better state, thus improving the kinetic performance and cycle life of the battery.

Optionally, in some embodiments of the present disclosure, $0.5 \le D_2 \le 8$. Optionally, it may be at least one of 0.5, 1, 1.5, 2, 2.5, 2.7, 3.0, 3.5, 3.8, 4, 4.3, 4.5, 4.8, 5, 5.5, 5.8, 6, 6.3, 6.5, 7, 8 or within a range defined by any two of these numbers. In case that the particle sizes of the positive active particles are in the above range, the permeability of the positive film is strong, the liquid phase diffusion capacity of the lithium ions are in a suitable range, and the solid phase conductivity of the lithium ions in the particles is strong, so that the comprehensive performance of the lithium-ion battery can be effectively ensured.

Dv50 of the positive active material and the negative active material can be measured by using a laser particle size analyzer.

Optionally, in some embodiments of the present disclosure, the powder compacted density of the negative active material under a pressure of 30 KN is $P_1$ g/cm$^3$, the powder compacted density of the positive active material under a pressure of 30 KN is $P_2$ g/cm$^3$, and the relationship between $P_1$ and $P_2$ satisfies $1.5 \le P_2/P_1 \le 2.5$. For example, the value of $P_2/P_1$ may be any one of 1.5, 1.6, 1.7, 1.8, 1.9, 2.0, 2.1, 2.2, 2.3, 2.4, 2.5, or within a range defined by any two of these numbers. In embodiment of the present disclosure, the powder compacted density ratio of the positive active material and the negative active material under a pressure of 30 KN is matched in a range of 1.5 to 2.5, which is beneficial to the diffusion of lithium ions inside the active materials and between active materials, thus improving the solid phase conductivity of lithium ions, reducing the impedance of the lithium-ion battery, and improving the fast charging capacity and cycle life of the lithium-ion battery. Optionally, in some embodiments of the present disclosure, the relationship between $P_2$ and $P_1$ satisfies $1.6 \le P_2/P_1 \le 2.4$.

Optionally, in some embodiments of the present disclosure, the relationship between $P_2$ and $P_1$ satisfies $1.8 \le P_2/P_1 \le 2.2$.

Optionally, in some embodiments of the present disclosure, the relationship between $P_2$ and $P_1$ satisfies $1.9 \le P_2/P_1 \le 2.1$.

Optionally, in some embodiments of the present disclosure, $1.5 \le P_1 \le 2.0$. Alternatively, it may be 1.6, 1.7, 1.8, 1.9 or within a range defined by any two of these numbers. In case that $P_1$ is within the above range, the pore structure and morphology of the negative active material, for example, the sphericity, are in a better state, so that the pore structure of the negative electrode plate can be improved, and the battery is in a better state.

Optionally, in some embodiments of the present disclosure, $2 \le P_2 \le 4$. Alternatively, it may be 2.1, 2.2, 2.5, 2.8, 3, 3.2 or within a range defined by any two of these numbers. In case that $P_2$ is within the above range, the matching degree between the positive electrode plate and the negative electrode plate is higher, so that the battery has better overall performance.

As for test of the powder compacted density of the negative active material, please refer to GB/T 24533-2019 graphite negative materials for lithium-ion battery. The test conditions are as follows: 1 g of negative active material is weight; pressurization speed: 8 mm/min; pressurization and holding time: 30 s; pressure after pressure removal: 20 N; speed of pressure removal: 30 mm/min; holding time after pressure removal: 10 s.

The test conditions for the positive active materials are as follows: 1.5 g of positive active material is weight; pressurization speed: 1 mm/min; pressurization and holding time: 60 s; pressure after pressure removal: 30 N; speed of pressure removal: 4 mm/min; holding time after pressure removal: 10 s.

Optionally, in some embodiments of the present disclosure, the positive active material includes one or more of a lithium iron phosphate material, a lithium manganese iron phosphate material, a lithium nickel-cobalt-manganese material, and a lithium nickel-cobalt-aluminum material.

The lithium iron phosphate material is $LiFePO_4$ (abbreviated as LFP).

The chemical formula of the lithium manganese iron phosphate material is $Li_yFe_xMn_{1-x}PO_4$; wherein $0.9 \le y \le 1.2$, and $0.25 \le x \le 0.5$. For example, the chemical formula of the lithium manganese iron phosphate material is $LiFe_{0.2}Mn_{0.8}PO_4$, $LiFe_{0.3}Mn_{0.7}PO_4$, $LiFe_{0.4}Mn_{0.6}PO_4$, or $LiFe_{0.5}Mn_{0.5}PO_4$.

The lithium nickel-cobalt-manganese material may be $Li_dNi_aCo_bMn_cA_eO_2$, wherein A includes at least one of Al, Zr, Ti, B, Mg, V, Cr, Zn, Y, W, Nb or La, $0.4<a<1$, $0<b<1$, $0<c<1$, $0.9 \le d \le 1.1$, $0 \le e \le 0.1$, $a+b+c=1$. For example, the lithium nickel-cobalt-manganese material may be NCM523, NCM622, NCM811, and the like.

The lithium nickel-cobalt-aluminum material may be $Li_{d1}Ni_{a1}Co_{b1}Al_{c1}A_{e1}O_2$, wherein A includes at least one of Zr, Ti, B, Mg, V, Cr, Zn, Y, W, Nb or La, $0.4<a1<1$, $0<b1<1$, $0<c1<1$, $0.9 \le d1 \le 1.1$, $0 \le e1 \le 0.1$, and $a1+b1+c1=1$.

The present disclosure further provides an electric apparatus including the battery according to any one of the above embodiments, and the battery is used as a power supply for the electric apparatus. The electric apparatus of the present disclosure may include, but is not limited to, a stand-by power supply, a motor, an electric vehicle, an electric motorcycle, an electric assist bicycle, bicycle, an electric tool, a large battery for a household, and the like.

Description will be made below with reference to specific examples. It should be understood that these examples are only used to illustrate the present disclosure and are not intended to limit the scope of the present disclosure.

Example 1

This example provides a method for preparing a negative electrode plate including steps of:

1. Preparation steps of a negative active material include: selecting petroleum coke raw coke with a sulfur content of 2 wt %, a volatile fraction of 8 wt %, and a HGI value of 60, and subjecting the petroleum coke raw coke to pretreatment processes such as crushing and pre-mixing in a roller mill, wherein a particle size after crushing pulverization ranges from 8 μm to 10 μm. Subjecting the crushed product to high-temperature graphitization treatment under a protective atmosphere at a temperature of 2800° C. to 3000° C., and holding at a maximum temperature of 3000° C. for 36 h, wherein the protective atmosphere is argon. Then grinding and shaping in a continuous shaping system for 8 h, so that the surface of particles of the product is smooth and flat, thus obtaining a negative active material (particle form) with a sphericity S of 0.7 and a particle size Dv50 ($D_1$) of 12 μm. The powder compacted density $P_1$ g/cm$^3$ of the negative active material at 30 KN pressure is 1.76 g/cm$^3$.
2. Preparation steps of a negative electrode slurry include: mixing the above-mentioned negative active material (finished artificial graphite), a conductive agent (carbon black), a binder (sodium carboxymethyl cellulose), and an additive (styrene-butadiene rubber) in a mass ratio of 96.5:1.5:1.5:0.5 to obtain a mixture, and then stirring the mixture with a solvent (deionized water) in a certain proportion under the action of a vacuum mixer, followed by uniformly mixing the mixture to obtain a negative electrode slurry.
3. Preparation steps of the negative electrode plate include: uniformly coating the prepared negative electrode slurry on both sides of a negative electrode current collector (copper foil), then drying by baking at a temperature of 90° C. to 110° C., and rolling to obtain a negative electrode plate. The compacted density of the negative film formed by the negative electrode slurry on the negative film is 1.6 g/cm$^3$. The non-faradic capacitance of the negative electrode plate can be adjusted by adjusting the rolling time and the size of the rolling pressure.

This example further provides a method for preparing a lithium-ion battery including the above-mentioned negative electrode plate, which includes steps of:

After the negative electrode plate and the positive electrode plate are dried, a winding core is prepared together with a separator (PP film) by using a winding machine, a positive electrode aluminum lug and a negative electrode copper nickel-plated lug are welded to the core, and the welded core is placed in an aluminum-plastic film which has been poured to be packaged, and then a lithium ion battery is prepared by liquid injection, chemical composition, and constant volume.

The preparation method of the above-mentioned positive electrode plate includes the following steps:

Preparing a positive electrode slurry by using a positive active material, a positive conductive agent, a positive binder, and a solvent (N-methylpyrrolidone, NMP). Coating uniformly the obtained positive binder on both sides of the positive electrode current collector (aluminum foil), and drying at 120° C., then rolling and cutting to obtain the positive electrode plate.

The particle size Dv50 ($D_2$) of the positive active material is 6.5 μm. The positive active material (NCM523), the positive conductive agent (carbon black), and the positive binder (polyvinylidene fluoride, PVDF) are mixed according to a mass ratio of 96:2:2. The powder compacted density $P_2$ g/cm$^3$ of the positive active material at 30 KN pressure is 3.55 g/cm$^3$.

Preparation method of the electrolyte includes: mixing ethylene carbonate (EC), methyl ethyl carbonate (EMC), and diethyl carbonate (DEC) according to a mass ratio of 1:1:1, and adding 1 mol/L of $LiPF_6$, then mixing evenly to obtain the electrolyte.

A buckle-type half-cell (buckle) is assembled by using the negative electrode plate obtained in this example. The buckle-type half-cell and the above-mentioned lithium-ion battery are subjected to the corresponding tests. The test method is as follows:

1. Non-faradic capacitance test includes the following steps: step 1, assembling the negative electrode plate and a metal lithium plate into a buckle-type half-cell (i.e., buckle); step 2, carrying out a CV test on the buckle-type half-cell in the voltage range of 0.005 V to 3.0 V at a sweep rate of 0.1 mV/s, and confirming that the non-faraday potential range is from 2.6 V to 2.7 V; step 3, carrying out a LSV test from 2.7 V to 2.6 V. The sweep rates are 0.1 mV/s, 0.2 mV/s, 0.5 mV/s, 1 mV/s and 2 mV/s respectively. The median value of the selected potential range is 2.65 V. The corresponding current values obtained are 1.72E$^{-05}$, 1.62E$^{-05}$, 1.57E$^{-05}$, 1.52E$^{-05}$, and 1.37E$^{-05}$ A; and step 4, drawing a sweep rate versus current scatter plot according to the sweep rates and current density values, and fitting to obtain a linear function, and the slope −1.62E$^{-06}$ of the linear function is the Cdl 1.62 nF in the cathodic scanning direction of the negative electrode plate according to this example.
2. Energy density test of a lithium-ion battery including the steps of: Allowing the lithium-ion battery to stand for 30 min at 25° C., fully charging at 1 C, and fully discharging at 1 C, followed by recording actual discharge energy; then weighing the lithium-ion battery by using an electronic balance. The ratio of 1 C actual discharge energy to the weight is the actual energy density of the lithium-ion battery. When the actual energy density is less than 80% of the target energy density, the actual energy density of the battery is considered to be very low. When the actual energy density is greater than or equal to 80% and less than 95% of the target energy density, the actual energy density of the battery is considered to be low. When the actual energy density is greater than or equal to 95% and less than 105% of the target energy density, the actual energy density of the battery is considered to be moderate. When the actual energy density is greater than or equal to 105% and less than 120% of the target energy density, the actual energy density of the battery is considered to be high. When the actual energy density is 120% of the target energy density, the actual energy density of the battery is considered to be very high.
3. Cycle performance test of a lithium-ion battery includes the following steps: subjecting the lithium-ion battery to charge and discharge at 25° C. Specifically, charging at a constant current of 1 C, standing for 10 min, discharging at a constant current of 1 C, and recording the first discharge capacity, then subjecting the battery to charging and discharging cycle for 2000 times at 1 C/1 C, followed by recording the 2000th discharge capacity of the battery. The capacity retention rate of the battery after charging/discharging cycle for 2000 times is obtained by dividing the 2000th discharge capacity of the battery by the first discharge capacity of the battery.
4. Rate performance test of a lithium-ion battery including the following steps: subjecting the lithium-ion battery to discharge at a constant current of 1 C and a temperature of 25° C., standing for 10 min, charging at a constant current of 3 C, and recording the first discharge capacity. Dividing this charging capacity by the first discharge capacity obtained by charging and discharging at 1 C/1 C to obtain the 3 C rate performance of the battery.
5. The pore size distribution and pore size value r of the negative active material are measured by mercury intrusion method.
6. The compacted density PD of the negative active material is tested by using a compaction densimeter. For the test procedure, please refer to the national standard GB/T 24533-2019.

Other Examples and Comparative Examples are tested with reference to the above methods.

Examples 2 to 5, Comparative Examples 1 to 2

The above examples and comparative examples provide a method for preparing a battery, in which the sphericity S of a negative active material is adjusted by adjusting parameters of the grinding and shaping step, and the coke raw material parameters of the negative active material are controlled as shown in the table below, and the non-faradic capacitance value Cdl of the negative electrode plate is adjusted at the same time. The other steps and parameters are the same as those in Example 1. Please refer to the following table for specific parameter adjustment.

Examples 6 to 10

The above examples and comparative examples provide a method for preparing a lithium-ion battery, which adjusts r of the negative active material. The other steps and parameters are the same as those in Example 1. The control of pore size is mainly achieved by selecting coke raw materials with different sulfur content and volatiles. The control of the non-faradic capacitance Cdl value is adjusted in combination with the stirring process and the rolling process, so long as the Cdl value is ensured to be within the range shown in Table 1.

Examples 11 to 15

The above examples provide a method for preparing a battery, in which the compacted density PD of a negative film is adjusted by adjusting the roll gap and pressure of a roller press in the rolling step, combining with adjusting related parameters such as a powder compacted density, a pore size, and a particle size. The other steps and parameters are the same as those in Example 1.

Examples 16 to 19

The above examples provide a method for preparing a lithium-ion battery, in which D50 ($D_1$) of a negative active material is adjusted by adjusting parameters of a crushing step in the preparation process of the negative active material (e.g., current of the host of a pulverizer), and D50 ($D_2$) of a positive active material is adjusted by adjusting parameters of the crushing step in the preparation process of the positive active material (e.g., a current of the host of a pulverizer). The other steps and parameters are the same as those in Example 1.

Examples 20 to 23

The above examples provide a method for preparing a battery, in which the powder compacted density $P_1$ of the negative active material is adjusted by adjusting parameters such as D50, the type of coke raw materials, HGI, and the like, and the powder compacted density $P_2$ of the positive active material is adjusted. The other steps and parameters are the same as those in Example 1.

Examples 24 to 28

The above example provides a method for preparing a battery, in which the type of positive active material is changed. The other steps and parameters are the same as those in Example 1.

Examples 29 to 31

The above examples provide a method for preparing a negative electrode plate and a lithium-ion battery, in which the component content and properties of the coke raw material are changed. The other steps and parameters are the same as those in Example 1.

The parameters and test results for each of the Examples and Comparative Examples are detailed in Tables 1 to 3.

TABLE 1

| Group | Cdl (nF) | S | Cdl × S | r (nm) | 0.1 × r + Cdl | T (min) | PD (g/cm$^3$) | T × PD |
|---|---|---|---|---|---|---|---|---|
| Example 1 | 1.62 | 0.7 | 1.1 | 4 | 2.02 | 0.5 | 1.6 | 0.8 |
| Example 2 | 1.66 | 0.75 | 1.2 | 4 | 2.06 | 0.55 | 1.62 | 0.9 |
| Example 3 | 5.5 | 0.86 | 4.7 | 3.5 | 5.85 | 2.8 | 1.68 | 4.7 |
| Example 4 | 6 | 0.5 | 3.0 | 3.7 | 6.37 | 2.8 | 1.69 | 4.7 |
| Example 5 | 8 | 0.2 | 1.6 | 4.2 | 8.42 | 3 | 1.7 | 5.1 |
| Comparative example 1 | 0.5 | 0.4 | 0.2 | 8 | 1.3 | 3 | 1.6 | 4.8 |
| Comparative example 2 | 6 | 0.9 | 5.4 | 4.3 | 6.43 | 2.7 | 1.68 | 4.5 |
| Example 6 | 2.2 | 0.6 | 1.3 | 2 | 2.4 | 0.6 | 1.4 | 0.8 |
| Example 7 | 2.2 | 0.6 | 1.3 | 5 | 2.7 | 0.5 | 1.6 | 0.8 |
| Example 8 | 2.2 | 0.6 | 1.3 | 10 | 3.2 | 3 | 1.65 | 5.0 |
| Example 9 | 2.2 | 0.6 | 1.3 | 20 | 4.2 | 3.3 | 1.67 | 5.5 |
| Example 10 | 2.2 | 0.6 | 1.3 | 25 | 4.7 | 3 | 1.65 | 5.0 |
| Example 11 | 2.4 | 0.7 | 1.7 | 3.5 | 2.75 | 0.4 | 1.6 | 0.6 |
| Example 12 | 1.65 | 0.5 | 0.8 | 3.5 | 2 | 1.2 | 1.62 | 1.9 |
| Example 13 | 2.3 | 0.6 | 1.4 | 4.5 | 2.75 | 2.2 | 1.66 | 3.7 |
| Example 14 | 4 | 0.8 | 3.2 | 4.5 | 4.45 | 3.7 | 1.68 | 6.2 |
| Example 15 | 5 | 0.82 | 4.1 | 4.5 | 5.45 | 0.2 | 1.2 | 0.2 |
| Example 16 | 5 | 0.85 | 4.3 | 3.6 | 8.36 | 3.2 | 1.7 | 5.4 |
| Example 17 | 5 | 0.8 | 4.0 | 3.6 | 5.36 | 3 | 1.65 | 5.0 |
| Example 18 | 4 | 0.78 | 3.1 | 3.6 | 4.36 | 3 | 1.7 | 5.1 |
| Example 19 | 5 | 0.85 | 3.1 | 3.6 | 8.36 | 3.2 | 1.7 | 5.4 |
| Example 20 | 5 | 0.3 | 1.5 | 5 | 5.5 | 0.28 | 1.12 | 0.3 |
| Example 21 | 5.5 | 0.4 | 2.2 | 8 | 6.3 | 0.3 | 1.2 | 0.4 |
| Example 22 | 6 | 0.5 | 3.0 | 18 | 7.8 | 0.5 | 1.4 | 0.7 |
| Example 23 | 6.2 | 0.5 | 3.1 | 6 | 6.8 | 0.6 | 1.4 | 0.8 |
| Example 24 | 1.62 | 0.7 | 1.1 | 4 | 2.02 | 0.5 | 1.6 | 0.8 |
| Example 25 | 1.62 | 0.7 | 1.1 | 4 | 2.02 | 0.5 | 1.6 | 0.8 |
| Example 26 | 1.62 | 0.7 | 1.1 | 4 | 2.02 | 0.5 | 1.6 | 0.8 |
| Example 27 | 1.62 | 0.7 | 1.1 | 4 | 2.02 | 0.5 | 1.6 | 0.8 |
| Example 28 | 1.62 | 0.7 | 1.1 | 4 | 2.02 | 0.5 | 1.6 | 0.8 |
| Example 29 | 4 | 0.5 | 2.0 | 2 | 4.2 | 0.3 | 1.3 | 0.4 |
| Example 30 | 4.5 | 0.55 | 2.5 | 5 | 5 | 0.5 | 1.6 | 0.8 |
| Example 31 | 5 | 0.7 | 3.5 | 18 | 6.8 | 1 | 1.65 | 1.7 |

TABLE 2

| Group | $D_1$ (μm) | $D_2$ (μm) | $D_1/D_2$ | $P_1$ (g/cm$^3$) | $P_2$ (g/cm$^3$) | $P_2/P_1$ | Positive active material |
|---|---|---|---|---|---|---|---|
| Example 1 | 12 | 6.5 | 1.85 | 1.76 | 3.55 | 2.0 | NCM523 |
| Example 2 | 11 | 6.5 | 1.69 | 1.79 | 3.55 | 2.0 | NCM523 |
| Example 3 | 8 | 6.5 | 1.23 | 1.82 | 3.55 | 2.0 | NCM523 |
| Example 4 | 9 | 6.5 | 1.38 | 1.84 | 3.55 | 1.9 | NCM523 |
| Example 5 | 7 | 6.5 | 1.08 | 1.85 | 3.55 | 1.9 | NCM523 |
| Example 1 | 12 | 6.5 | 1.85 | 1.68 | 3.55 | 2.1 | NCM523 |
| Example 2 | 9 | 6.5 | 1.38 | 1.88 | 3.55 | 1.9 | NCM523 |
| Example 6 | 11 | 6 | 1.83 | 1.71 | 3.4 | 2.0 | NCM523 |
| Example 7 | 11 | 6.5 | 1.69 | 1.75 | 3.4 | 1.9 | NCM523 |
| Example 8 | 14 | 6 | 2.33 | 1.82 | 3.44 | 1.9 | NCM523 |
| Example 9 | 16 | 5 | 3.20 | 1.85 | 3.42 | 1.8 | NCM523 |
| Example 10 | 13 | 7.5 | 1.73 | 1.8 | 3.05 | 1.7 | NCM523 |
| Example 11 | 10 | 4 | 2.50 | 1.78 | 3.62 | 2.0 | NCM523 |
| Example 12 | 11 | 4.5 | 2.44 | 1.76 | 3.62 | 2.1 | NCM523 |
| Example 13 | 14 | 5.5 | 2.55 | 1.82 | 3.62 | 2.0 | NCM523 |
| Example 14 | 14 | 6 | 2.33 | 1.84 | 3.62 | 2.0 | NCM523 |
| Example 15 | 10 | 4.5 | 2.22 | 1.8 | 3.62 | 2.0 | NCM523 |
| Example 16 | 6 | 0.5 | 12.00 | 1.85 | 3.7 | 2.0 | NCM523 |
| Example 17 | 15 | 2 | 7.50 | 1.88 | 3.7 | 2.0 | NCM523 |
| Example 18 | 18 | 8 | 2.25 | 1.9 | 3.7 | 1.9 | NCM523 |
| Example 19 | 6 | 8 | 0.75 | 1.84 | 3.7 | 2.0 | NCM523 |
| Example 20 | 6 | 0.6 | 10.00 | 1.5 | 2.2 | 1.5 | NCM523 |
| Example 21 | 12 | 0.6 | 20.00 | 2 | 3.1 | 1.6 | NCM523 |
| Example 22 | 8 | 0.8 | 10.00 | 1.6 | 4 | 2.5 | NCM523 |
| Example 23 | 7 | 1 | 7.00 | 1.5 | 4 | 2.7 | NCM523 |
| Example 24 | 12 | 5 | 2.40 | 1.76 | 3.62 | 2.1 | NCM622 |
| Example 25 | 12 | 7.5 | 1.60 | 1.76 | 3.92 | 2.2 | NCM811 |
| Example 26 | 12 | 3 | 4.00 | 1.76 | 2.8 | 1.6 | $LiFePO_4$ |
| Example 27 | 12 | 4 | 3.00 | 1.76 | 3.5 | 2.0 | $0.5Li_2MnO_3 \cdot 0.5LiNiO_2$ |
| Example 28 | 12 | 5.5 | 2.18 | 1.76 | 3.63 | 2.1 | $LiNi_{0.6}Mg_{0.4}O_2$ |
| Example 29 | 12 | 5.5 | 2.18 | 1.76 | 3.6 | 2.0 | NCM523 |
| Example 30 | 14 | 6 | 2.33 | 1.79 | 3.6 | 2.0 | NCM523 |
| Example 31 | 15 | 5 | 3.00 | 1.8 | 3.6 | 2.0 | NCM523 |

TABLE 3

| Group | Sulfur content in coke raw material (wt %) | Volatile content in coke raw material (wt %) | HGI | Energy density | Cycle performance at 25° C.(%) | 3C-rate performance (%) |
|---|---|---|---|---|---|---|
| Example 1 | 2 | 8 | 60 | Very high | 92 | 87 |
| Example 2 | 2 | 8 | 65 | High | 88 | 85 |
| Example 3 | 1.5 | 6 | 66 | Very high | 90 | 85 |
| Example 4 | 1.5 | 10 | 67 | Very high | 90 | 86 |
| Example 5 | 2.2 | 7 | 67 | Very high | 91 | 86 |
| Comparative example 1 | 3 | 9 | 50 | Very low | 74 | 72 |
| Comparative example 2 | 2.3 | 8.2 | 70 | Low | 77 | 70 |
| Example 6 | 1.2 | 5 | 55 | High | 88 | 80 |
| Example 7 | 2.6 | 8.5 | 56 | High | 89 | 82 |
| Example 8 | 3.6 | 10 | 65 | Very high | 88 | 84 |
| Example 9 | 3.8 | 14 | 66 | High | 88 | 84 |
| Example 10 | 4 | 15 | 57 | Low | 82 | 74 |
| Example 11 | 1.6 | 6 | 65 | High | 89 | 81 |
| Example 12 | 1.6 | 6 | 60 | High | 87 | 80 |
| Example 13 | 1.5 | 5.8 | 64 | Very high | 90 | 82 |
| Example 14 | 1.6 | 5.9 | 66 | Low | 78 | 73 |
| Example 15 | 1.5 | 5.9 | 56 | Moderate | 77 | 73 |
| Example 16 | 1.6 | 5.6 | 66 | Very high | 88 | 84 |
| Example 17 | 1.7 | 5.5 | 72 | Very high | 87 | 82 |
| Example 18 | 1.6 | 5.5 | 80 | Very high | 87 | 82 |
| Example 19 | 1.6 | 5.6 | 66 | Moderate | 83 | 80 |
| Example 20 | 2.6 | 8.5 | 40 | High | 88 | 82 |
| Example 21 | 3.6 | 10.5 | 95 | High | 88 | 84 |
| Example 22 | 3.7 | 14 | 45 | Very high | 90 | 85 |
| Example 23 | 2.6 | 8.2 | 42 | Moderate | 82 | 75 |
| Example 24 | 2 | 8 | 60 | Very high | 92 | 82 |
| Example 25 | 2 | 8 | 60 | Very high | 91 | 85 |
| Example 26 | 2 | 8 | 60 | High | 92 | 80 |
| Example 27 | 2 | 8 | 60 | High | 90 | 82 |
| Example 28 | 2 | 8 | 60 | High | 90 | 83 |
| Example 29 | 0.1 | 5 | 58 | High | 87 | 84 |

TABLE 3-continued

| Group | Sulfur content in coke raw material (wt %) | Volatile content in coke raw material (wt %) | HGI | Energy density | Cycle performance at 25° C.(%) | 3C-rate performance (%) |
|---|---|---|---|---|---|---|
| Example 30 | 1 | 10 | 60 | High | 89 | 86 |
| Example 31 | 4 | 15 | 65 | Very high | 91 | 86 |

As can be seen from the test results of each of the above Examples and Comparative Examples, it can be seen from the Comparative Examples and Comparative Examples that when the relationship between the non-faradic capacitance (Cdl nF) of the negative electrode plate and the sphericity S of the negative active substance satisfies $0.5 \le Cdl \times S \le 5$, the battery has a higher energy density, a better cycle performance and a higher rate performance.

Comparing Example 6 to Example 9 with Example 10, it can be seen that when $2 \le r \le 20$ and $1.2 \le 0.1 \times r + Cdl \le 10$, the energy density and cycle performance can be further improved, and higher rate performance of the battery can be obtained.

Comparing Example 11 to Example 13 with Example 14 to Example 15, it can be seen that when the relationship between the liquid absorption time (T min) of the negative film and the compacted density (PD g/cm$^3$) of the negative film satisfies $0.3 \le T \times PD \le 5.8$, the energy density, cycle performance and rate performance of the battery are further improved, and when $0.25 \le T \le 3.5$, the performance of the battery is better.

Comparing Example 16 to Example 18 with Example 19, it can be seen that when the negative electrode plate satisfies $0.5 \le Cdl \times S \le 5$, the relationship between the particle size $D_1$ of the negative active material and the particle size $D_2$ of the positive active material satisfies $1 \le D_1/D_2 \le 36$, both the positive electrode plate and the negative electrode plate can have a more matched transport performance of electrons and lithium ions, thereby further improving the performance of the lithium-ion battery.

Comparing Example 20 to Example 22 with Example 23, it can be seen that, when the negative electrode plate satisfies $0.5 \le Cdl \times S \le 5$, and the relationship between the powder compacted density P1 of the negative active material under 30 KN pressure and the powder compacted density P2 of the positive active material under 30 KN pressure satisfies $1.5 \le P_2/P_1 \le 2.5$, it is beneficial to the diffusion of lithium ions in and between active materials, thus improving the solid-phase conductivity of lithium ions, and improving the matching between positive active materials and negative active materials, thereby further reducing the impedance of lithium-ion batteries, and further improving the fast charging ability and cycle life of lithium-ion batteries.

The principles and embodiments of the present disclosure are described by using specific examples herein above. Descriptions of the above examples are merely intended to help understand the methods and core ideas of the present disclosure. At the same time, for those skilled in this field, there will be changes in the specific embodiments and application scope based on the ideas of the present disclosure. In view of the foregoing, the contents of the present disclosure should not be understood as limiting the present disclosure.

What is claimed is:

1. A battery, comprising a positive electrode plate, a negative electrode plate, a separator, and an electrolyte, wherein the positive electrode plate comprises a positive electrode current collector and a positive film disposed on at least one surface of the positive electrode current collector, and the positive film comprises a positive active material;

the negative electrode plate comprises a negative electrode current collector and a negative film disposed on at least one surface of the negative electrode current collector, the negative film comprises a negative active material; and the negative active material comprises negative active particles containing pores; and a non-faradic capacitance of the negative electrode plate is Cdl nF, and a sphericity of the negative active material is S, and satisfies: $0.5 \le Cdl \times S \le 5$.

2. The battery according to claim 1, wherein $0.5 \le Cdl \le 8$.

3. The battery according to claim 1, wherein $0.2 \le S \le 0.9$.

4. The battery according to claim 1, wherein a pore size of the negative active material is r nm, and satisfies: $1.2 \le 0.1 \times r + Cdl \le 10$.

5. The battery according to claim 4, wherein a pore size distribution of the negative active material satisfies $2 \le r \le 20$.

6. The battery according to claim 4, wherein the negative active material has at least one peak in a region with the pore size distribution of 2 nm to 6 nm.

7. The battery according to claim 1, wherein a liquid absorption time of the negative film is T min, and a compacted density of the negative film is PD g/cm$^3$, and satisfies: $0.3 \le T \times PD \le 5.8$.

8. The battery according to claim 7, wherein $0.25 \le T \le 3.5$; and $1.1 \le PD \le 1.7$.

9. The battery according to claim 1, wherein Dv50 of the negative active material is $D_1$ μm, Dv50 of the positive active material is $D_2$ μm, and the $D_1$ and $D_2$ satisfies $1 \le D_1/D_2 \le 36$.

10. The battery according to claim 9, wherein $6 \le D_1 \le 18$.

11. The battery according to claim 9, wherein $0.5 \le D_2 \le 8$.

12. The battery according to claim 1, wherein a powder compacted density of the negative active material under a pressure of 30 KN is $P_1$ g/cm$^3$, a powder compacted density of the positive active material under a pressure of 30 KN is $P_2$ g/cm$^3$, and a relationship between $P_1$ and $P_2$ satisfies $1.5 \le P_2/P_1 \le 2.5$.

13. The battery according to claim 12, wherein $1.5 \le P_1 \le 2.0$.

14. The battery according to claim 12, wherein $2 \le P_2 \le 4$.

15. The battery according to claim 1, wherein the negative active material comprises a carbon material, and the carbon material comprises graphite.

16. An electrical apparatus comprising a battery, wherein the battery is used as a power supply for the electrical apparatus; and wherein the battery comprises a positive electrode plate, a negative electrode plate, a separator film, and an electrolyte, wherein the positive electrode plate comprises a positive electrode current collector and a positive film disposed on at least one surface of the positive electrode current collector, and the positive film comprises a positive active material;

the negative electrode plate comprises a negative electrode current collector and a negative film disposed on at least one surface of the negative electrode current collector, the negative film comprises a negative active material; and the negative active material comprises negative active particles containing pores; and a non-faradic capacitance of the negative electrode plate is Cdl nF, and a sphericity of the negative active material is S, and satisfies: $0.5 \leq Cdl \times S \leq 5$.

17. The electrical apparatus according to claim 16, wherein a pore size of the negative active material is r nm, and satisfies: $1.2 \leq 0.1 \times r + Cdl \leq 10$.

18. The electrical apparatus according to claim 16, wherein a liquid absorption time of the negative film is T min, and a compacted density of the negative film is PD g/cm$^3$, and satisfies: $0.3 \leq T \times PD \leq 5.8$.

19. The electrical apparatus according to claim 16, wherein Dv50 of the negative active material is $D_1$ μm, Dv50 of the positive active material is $D_2$ μm, and the $D_1$ and $D_2$ satisfies $1 \leq D_1/D_2 \leq 36$.

20. The electrical apparatus according to claim 16, wherein a powder compacted density of the negative active material under a pressure of 30 KN is $P_1$ g/cm$^3$, a powder compacted density of the positive active material under a pressure of 30 KN is $P_2$ g/cm$^3$, and a relationship between $P_1$ and $P_2$ satisfies $1.5 \leq P_2/P_1 \leq 2.5$.

* * * * *